United States Patent [19]

Andronica

[11] Patent Number: 5,799,907
[45] Date of Patent: Sep. 1, 1998

[54] PIPE STRAPS

[76] Inventor: Ronald Andronica, 1130 44th St., Brooklyn, N.Y. 11219

[21] Appl. No.: 606,564

[22] Filed: Feb. 26, 1996

[51] Int. Cl.$^6$ .................................................. E21F 17/02
[52] U.S. Cl. .................................................. 248/62; 248/73
[58] Field of Search .......................... 248/62, 71, 72, 248/73, 74.4, 74.2, 74.1

[56] References Cited

U.S. PATENT DOCUMENTS

| | | | |
|---|---|---|---|
| 2,375,513 | 5/1945 | Bach | 248/59 |
| 3,417,951 | 12/1968 | Rebentisch, Jr. | 248/62 |
| 3,463,428 | 8/1969 | Kindorf et al. | 248/72 |
| 3,486,726 | 12/1969 | Kindorf et al. | 248/72 |
| 3,527,432 | 9/1970 | Lytle | 248/62 |
| 3,547,385 | 12/1970 | Kindorf | 248/62 |
| 3,888,440 | 6/1975 | Rebentisch | 248/73 |
| 4,119,285 | 10/1978 | Bisping et al. | 248/72 |
| 4,516,296 | 5/1985 | Sherman | 24/279 |
| 4,662,590 | 5/1987 | Hungerford, Jr. | 248/72 |
| 4,961,553 | 10/1990 | Todd | 248/62 |
| 5,141,186 | 8/1992 | Cusic | 248/73 |

Primary Examiner—Leslie A. Braun
Assistant Examiner—Anita M. King
Attorney, Agent, or Firm—Goodman & Teitelbaum, Esqs.

[57] ABSTRACT

A pipe strap for mounting on the bottom portion of a strut so that pipes can be clamped thereto in addition to the pipes already clamped to the top portion of the strut, the pipe strap including an upper flange portion with an opening therein to receive a threaded bolt therethrough for securing the pipe strap to an associated pipe strap with the pipe therebetween, and a curved arm extending downwardly from the upper flange portion for clamping against the pipe, the curved arm having a reduced lower tab portion for engaging in one of the slotted holes in the bottom portion of the strut to secure the pipe strap thereto so that the pipe strap coacts with the associated pipe strap to clamp the pipe to the bottom portion of the strut in a fixed engagement therewith. In one embodiment, the bottom flange of the pipe strap has a transverse width smaller than the longitudinal length of the slotted hole in the strut for insertion therein. In a second embodiment, the bottom flange has a transverse width larger than the transverse width across the longitudinal opening in the top portion of the strut so that this second pipe strap can be mounted on either the top portion or the bottom portion of the strut. Preferably, the enlarged head of the threaded bolt is spot-welded to the outer surface of the upper flange of one of the pipe straps.

15 Claims, 3 Drawing Sheets

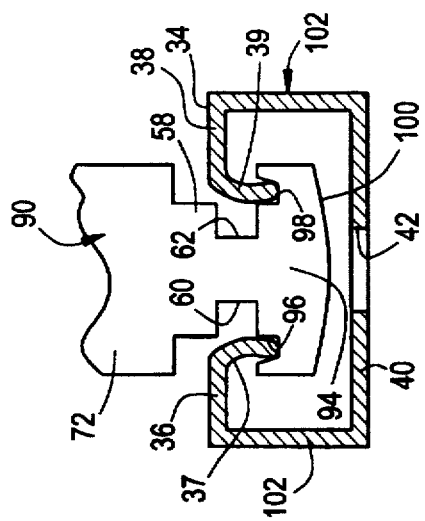
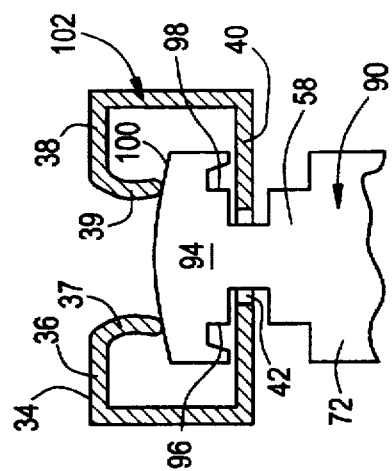
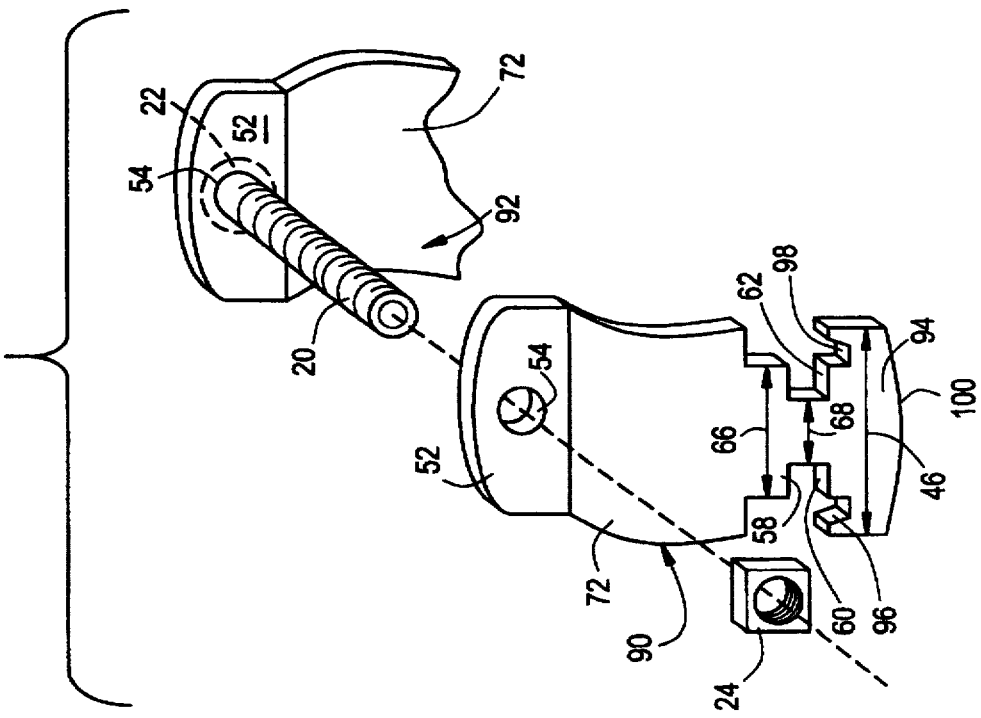

PIPE STRAPS

BACKGROUND OF THE INVENTION

The invention relates to pipe straps for clamping a pipe to a strutural supporting element, such as a channel member or strut, and more particularly to pipe straps which can be secured within the slotted holes in the bottom portion of the strut while other or the same type of pipe straps are secured in the channeled or longitudinally extending opening in the top portion of the strut so that pipes are clamped to both the top and bottom portions of the strut.

Pipe straps or clamps ar e well known in the prior art, being in widespread use in the construction industry, where they are used extensively by electricians, plumbers and steam fitters to install multiple pipes on channel members or struts. The channel members or struts are commercially available, being a structural rack that is open on the top side thereof and is usually perforated with slotted holes on the bottom side thereof to facilitate ease of installation thereof for mounting. The struts usually come in predetermined lengths which can be cut smaller depending upon the number of pipes which are to be installed. The pipes are secured to the strut by a pair of stamped metal pipe straps that fit into the elongated opening or channel in the top side of the strut, where the slotted holes in the bottom side of the strut are used for securing the s trut in a desired position.

For example, U.S. Pat. No. 2,375,513 discloses a pipe hanger system including a one piece pipe hanger having two spaced apart curved arms for gripping a pipe therebetween when secured to the strut or housing, where this patent discloses many different arrangements for the pipe hangers on the strut. U.S. Pat. No. 3,417,951 discloses a pair of pipe straps or clamping sections which are clamped together by a bolt and nut arrangement when mounted on the strut. U.S. Pat. No. 3,463,428 also discloses a two piece pipe clamp secured togther by a bolt and nut which can be attached to one edge of the channel in the strut. Likewise, U.S. Pat. No. 4,516,296 discloses a pipe clamp having two identical halves that are curved to hold a pipe, where U.S. Pat. No. 5,141,186 discloses a pipe clamp having two halves having different lengths so that the bolt and nut extend obliquely and are laterally off-set to one side of the pipe clamp.

Often times it becomes necessary, either by oversight or by extra work orders, to install additional pipes on any given strut, which cannot be accomplished by the prior art pipe straps. Accordingly, there is presently a need for a pipe strap that can be installed in the slotted holes in the bottom side of the strut so that additional pipes can be installed thereon.

SUMMARY OF THE INVENTION

It is an object of the present invention to provide a pipe strap which avoids the problems of the prior art pipe straps.

Another object of the present invention is to provide a pipe strap that can be mounted in a slotted hole in the bottom portion of a strut so that additional pipes can be clamped to the bottom portion of the strut in addition to the pipes already clamped to the top portion of the strut.

A further object of the present invention is to provide a pipe strap having a bottom flange with a predetermined transverse width which can be inserted into the slotted hole in the bottom portion of the strut for securement thereto.

Still another object of the present invention is to provide the above pipe strap with a pair of opposing slots in the lower tab portion thereof so that the transverse length between the opposing slots is shorter than the transverse width of each slotted hole in the bottom portion of the strut.

Another object of the present invention is to provide the above pipe strap with a bottom flange having a predetermined transverse width which is greater than the transverse width across the longitudinal opening in the top portion of the strut so that the pipe strap can be secured to either the top portion or the bottom portion of the strut.

Yet another object of the present invention is to provide the above pipe strap with cut-outs in the upper edge of the bottom flange on opposite sides thereof to receive inwardly directed lips provided on the top portion of the strut.

And still yet another object of the present invention is to spot-weld the enlarged head of the threaded bolt to an outer surface of the upper flange portion of the pipe strap when the threaded bolt is extended through the hole therefor in the upper flange portion.

Briefly, in accordance with the present invention, there is provided a pipe strap for mounting on the bottom portion of a strut so that pipes can be clamped thereto in addition to the pipes already clamped to the top portion of the strut. The pipe strap includes an upper flange portion with an opening therein to receive a threaded bolt therethrough for securing the pipe strap to an associated pipe strap with the pipe therebetween, and a curved arm extending outwardly from the upper flange portion for clamping against the pipe. The curved arm has a reduced lower tab portion for engaging in one of the slotted holes in the strut to secure the pipe strap thereto so that the pipe strap coacts with the associated pipe strap to clamp the pipe to the bottom portion of the strut in a fixed engagement therewith.

In one embodiment, the bottom flange has a transverse width smaller than the longitudinal length of the slotted hole in the strut for insertion therein, where the top portion is provided with two opposing slots having a transverse length therebetween which is shorter than the transverse width of the slotted hole so that the top portion can be locked in the slotted hole in the strut. In a second embodiment, the bottom flange has a transverse width larger than the transverse width across the longitudinal opening in the top portion of the strut so that this second modified pipe strap can be mounted on either the top portion or the bottom portion of the strut. Additionally, cut-outs are provided in the upper edge of the bottom flange on opposite sides thereof to receive inwardly directed lips provided on the top portion of the strut. Preferably, after the threaded bolt is inserted through the hole in the upper portion of the pipe strap, the enlarged head of the threaded bolt is spot-welded to the outer surface of the upper flange.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which:

FIG. 7 is a fragmented exploded perspective view showing modified pipe straps in accordance with the present invention;

FIG. 8 is a fragmented elevational end view, partly in cross section, showing one modified pipe strap of FIG. 7 being engaged in an altered strut similar to FIG. 5; and FIG. 9 is a fragmented elevational end view, partly in cross section, showing one of the modified pipe straps of FIG. 7 engaged in a longitudinally extending slot of the altered strut in a similar manner as shown in FIG. 1.

In the various figures of the drawings, like reference characters designate like parts.

DESCRIPTION OF THE PREFERRED EMBODIMENTS

Figure 1:
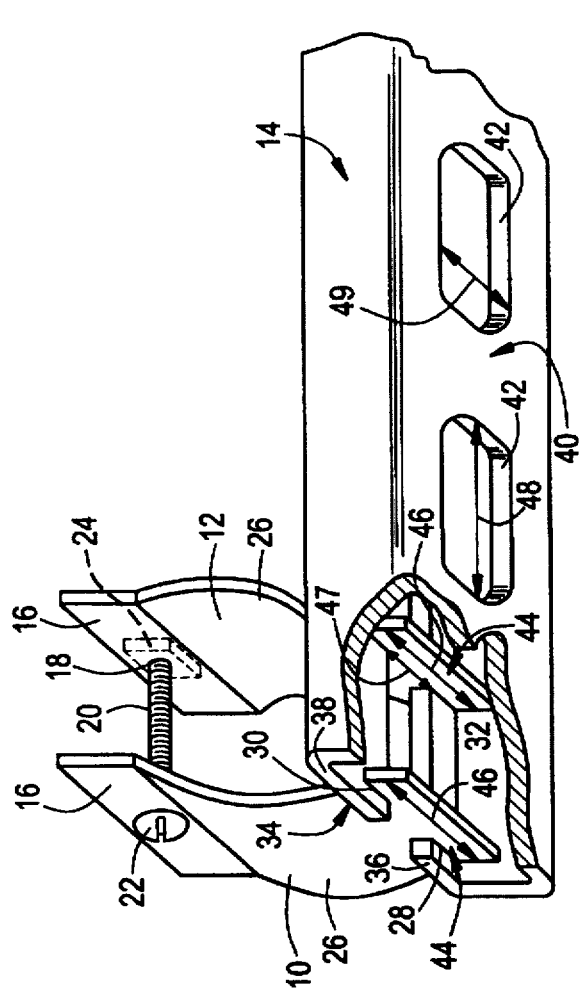
FIG. 1 is a fragmented perspective view of the prior art, showing pipe straps mounted on a strut.

Referring now to the drawings, FIG. 1 shows prior art pipe straps 10, 12 mounted on a conventional strut 14, well known in the art, similar to the showing in the above-mentioned U.S. Pat. No. 2,375,513. Each pipe strap 10, 12 includes an upper or top flange portion 16 having an opening or hole 18 therethrough to recieve a threaded bolt 20 having an enlarged head 22 at one end thereof. The threaded bolt 20 serves to draw the flange portions 16 together when a pipe is positioned between the pipe straps 10, 12, where the threaded bolt 20 is locked by a conventional nut 24 on the other end thereof.

Figure 6:
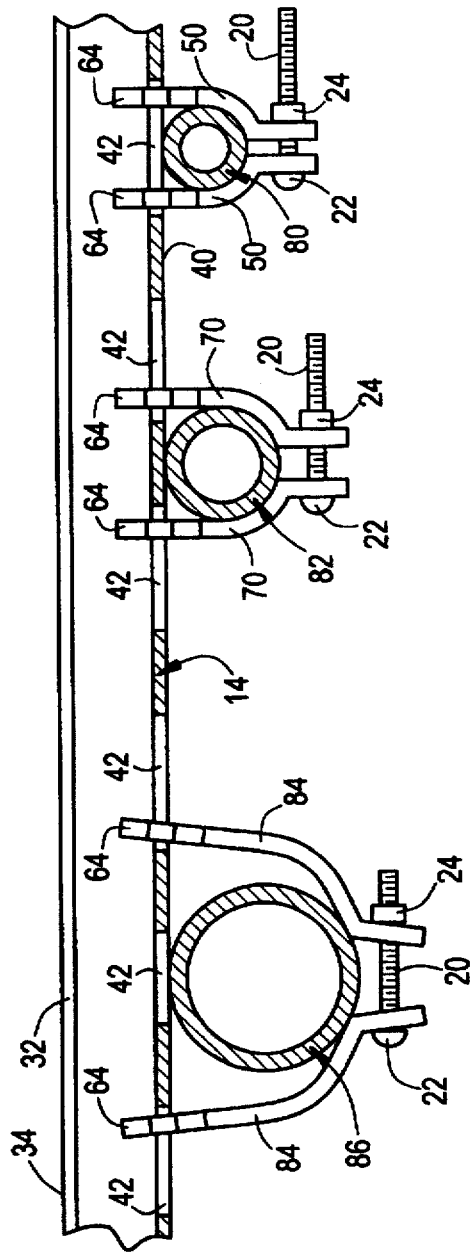
FIG. 6 is a fragmented elevational side view, partly in cross section, showing various arrangements for the different sized pipe straps securing different sized pipes to the prior art strut of FIG. 1.

A curved arm 26 extends downwardly from the flange portion 16. The dimensions of the curved arms 26 of the pipe straps 10, 12 and the shape thereof relative to the circumference of the pipe which is to be suspended, are such that the pipe is forced into contact with the strut 14 when the threaded bolt 20 and the nut 24 are tightened, as best shown in FIG. 6 which will be discussed below. The lower free end of the arm 26 has a pair of two opposing slots 28, 30 extending inwardly from the opposite side edges thereof, which serve for engagement with the strut 14 as explained below.

The strut 14 has a channelled rack arrangement with a longitudinally extending opening 32 in its top portion 34 to provide spaced apart longitudinally extending flanges 36, 38, with its bottom portion 40 being perforated with longitudinally spaced apart slotted holes 42, approximately 1½" on centers, to facilitate the mounting of the strut 14. The struts 14 usually come in 10-foot lengths, and can be cut smaller depending upon the number of pipes to be installed.

Accordingly, to secure a pipe to the strut 14, the pipe strapes 10, 12 are mounted on the strut 14 in the opening 32 so that the flanges 36, 38 of the strut 14 are received in the slots 28, 30 of each pipe strap 10, 12, as shown in FIG. 1, where the pipe is positioned between the curved arms 26 of the pipe straps 10, 12. The threaded bolt 20 is inserted through the holes 18 in the upper flange portions 16 so that the enlarged head 22 engages against the outer surface of one of the flange portions 16. The nut 24 is then inserted on the opposite end of the threaded bolt 20 so that the nut 24 engages against the outer surface of the other flange portion 16. The nut 24 is now tightened on the threaded bolt 20 in a conventional manner to draw the upper flange portions 16 of the pipe straps 10, 12 together, so that the pipe is forced into contact with the strut 14 for a fixed engagement therewith, as best shown in FIG. 6.

As disclosed in U.S. Pat. No. 2,375,513, the slotted holes 42 in the strut 14 receive bolts with associated nuts threaded thereon to mount the strut 14 in the installation thereof. It is noted, that the bottom flanges 44 formed on the lower free end portions of the arms 26 of the pipe straps 10, 12 by the two opposing slots 28, 30, have a transverse length 46 which is longer than the longitudinal length 48 of each slotted hole 42. Furthermore, the transverse length 47 between the opposing slots 28, 30 on each pipe strap 10, 12 is greater than the transverse width 49 of each slotted hole 42 to prevent mating engagement therein. Thus, in the prior art, the lower free end bottom flange 44 of each pipe strap 10, 12 cannot be fitted or inserted through any of the slotted holes 42 of the strut 14. However, as will be set forth below, the pipe strap of the present invention improves upon this structure thereof to permit a portion of the pipe strap to be inserted into the slotted holes of the strut.

Figure 2:
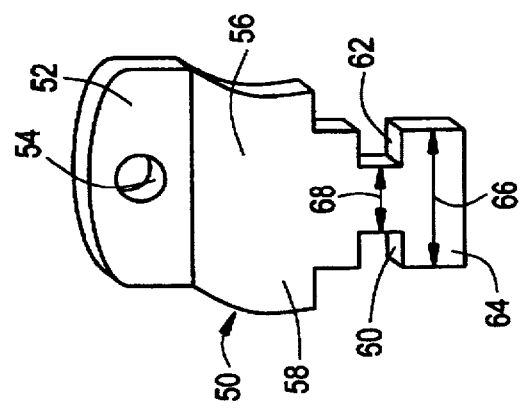
FIG. 2 is a perspective view showing a pipe strap in accordance with the present invention.

FIG. 2 shows an improved pipe strap 50 in accordance with the present invention. The pipe strap 50, in some respect, is similar to the above-mentioned prior art pipe straps 10, 12, and includes an upper or top flange portion 52 having an opening 54 therethrough to receive the conventional threaded bolt 20, and a curved arm 56 extending downwardly from the flange portion 52. However, the lower portion of the arm 56 is stepped or reduced inwardly from the opposite side edges thereof to provide a lower tab portion 58. The lower free end portion of the tab portion 58 has a pair of two opposing slots 60, 62 extending inwardly from the opposite side edges thereof to provide a bottom flange 64 at the lower free end.

It is noted, that the bottom flange 64, as well as the tab portion 58, has a predetermined transverse length 66 between the side edges of the tab portion 58 which is shorter than the longitudinal length 48 of each of the above-mentioned slotted holes 42 of the prior art strut 14 so that the slotted holes 42 can receive the bottom flange 64 therethrough. Furthermore, the transverse length 66 of the bottom flange 64 is longer than the transverse width 49 of each slotted hole 42, but the transverse length 68 between the opposing slots 60, 62 is shorter than the transverse width 49 of each slotted hole 42, the function of which will be set forth below.

Figure 3:
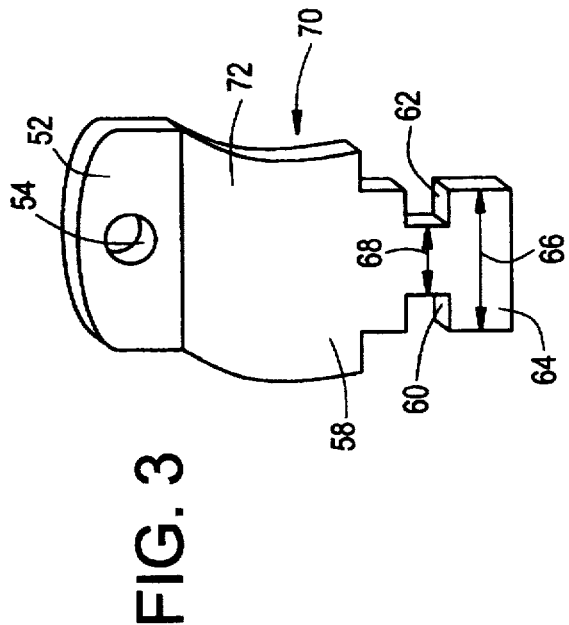
FIG. 3 is a perspective view showing an enlarged pipe strap similar to the pipe strap of FIG. 2.

The curved arm 56 of the pipe strap 50 has a predetermined longitudinal length for engaging a pipe with a predetermined sized diameter, so that for pipes having larger or smaller sized diameters, a different pipe strap would have to be used, as shown in FIG. 6 as described below. Accordingly, FIG. 3 shows a pipe strap 70 having a curved arm 72 which is longitudinally longer than the curved arm 56 of the pipe strap 50 shown in FIG. 2, so that the pipe strap 70 can engage a pipe with a larger sized diameter. The remaining portion of the pipe strap 70 are the same as the pipe strap 50, including an upper flange portion 52 having an opening 54 therethrough to receive the conventional threaded bolt 20, a tab portion 58 extending downwardly from the curved arm 72, a pair of two opposing slots 60, 62 extending inwardly from opposite side edges of the tab portion 58 and having a predetermined transverse length 68 therebetween to provide the bottom flange 64 at the lower free end, where the bottom flange 64 has a predetermined transverse length 66 between the side edges thereof.

Figure 4:
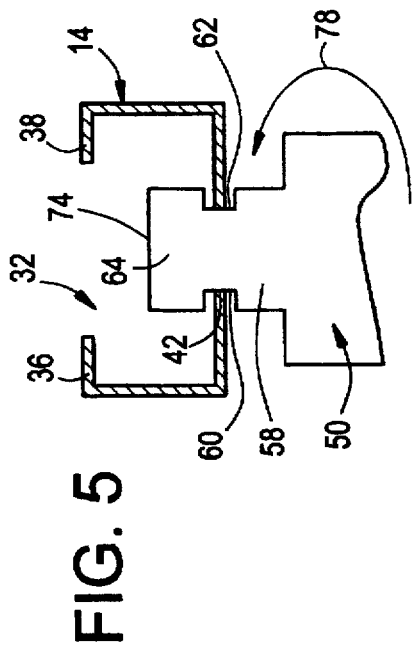
FIG. 4 is a fragmented elevational side view, partly in cross section, showing the pipe strap of either FIG. 2 or 3 being inserted into the strut shown in FIG. 1.
Figure 5:
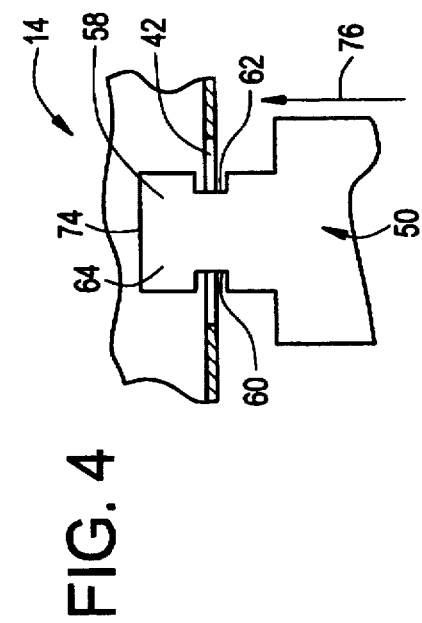
FIG. 5 is a fragmented elevational end view, partly in cross section, showing the pipe strap and strut of FIG. 4 being engaged togther.

Referring now to FIGS. 4 and 5, the mounting of the pipe strap 50 onto the strut 14 will now be discussed, where it is understood that the mounting of the pipe strap 70, or any enlarged or shortened pipe strap in accordance with the present invention, would be the same. As shown in FIG. 4, the transverse lower free edge 74 of the bottom flange 64 is lined up with the longitudinal length 48 of one of the slotted holes 42 in the strut 14, and then inserted into the strut 14 in the direction of the arrow 76 until the opposing slots 60, 62 in the tab portion 58 are in alignment with the slotted hole 42. Thereafter, the pipe strap 50 is turned 90 degrees in the direction of arrow 78, as shown in FIG. 5. It is noted, that the shorter transverse length 68 between the opposing slots 60, 62 permitted the pipe strap 50 to be rotated in the slotted hole 42 which has a longer transverse width 49 as stated above.

Thus, the bottom flange 64 which has a longer transverse length 66 than the transverse width 49 of the slotted hole 42 as stated above, now locks the pipe strap 50 in the slotted hole 42 to mount the pipe strap 50 on the strut 14. Accordingly, depending upon the diameter of the pipe, another pipe strap 50 is locked in the same or another slotted hole 42. The preselected pipe is positioned between the curved arms 56 of the associated pair of pipe straps 50, and the conventional threaded bolt 20 is inserted through the openings 54 in each pipe strap 50. A conventional nut 24 is threaded onto the threaded bolt 20 and tightened so that the upper flange portions 52 of the pipe straps 50 are drawn together to force the pipe into contact with the strut 14 to provide a fixed engagement therebetween.

FIG. 6 shows a conventional strut 14 having a pair of identical pipe straps 50 mounted thereon to secure a conventional pipe 80 having a ½" diameter thereon, where both of the bottom flanges 64 are inserted through the same slotted hole 42. A pair of identical pipe straps 70 are disclosed engaging a conventional pipe 82 having a ¾" to 2" diameter to secure same to the strut 14, where the bottom flange 64 of one pipe strap 70 is inserted through one slotted hole 42, and the bottom flange 64 of the other pipe strap 70 is inserted through an adjacent slotted hole 42. A pair of larger identical pipe straps 84 are shown engaging a conventional pipe 86 having a 3" diameter for securing same to the strut 14, where the bottom flange portion 64 of one pipe strap 84 is secured in one slotted hole 42, and the bottom flange 64 on the other pipe strap 84 is insereted through another slotted hole 42 spaced one slotted hole 42 from the first mentioned slotted hole 42 in a skipped arrangement. Accordingly, if it is necessary to install additional pipes on the strut 14 shown in FIG. 6, the above-mentioned prior art pipe straps 10, 12 can be secured in the opening 32 in the top portion 34 of the strut 14 to secure the additional pipes in the same manner as mentioned above.

As indicated above, in order to secure pipes to both the top portion 34 and the bottom portion 40 of the conventional strut 14, it would be necessary to use both the prior art pipe straps 10, 12 for the top portion 34, and the pipe straps 50, 70, 84 of the present invention for the bottom portion 40. Accordingly, discussed below is a modified pipe strap which can be mounted on both the top portion 34 and the bottom portion 40 of the conventional strut 14. However, for a better engagement, strap 90 has been modified even though the above-mentioned strut 14 can function with the modified pipe straps, as indicated below.

FIG. 7 shows a pair of modified identical pipe straps 90, 92, which in some respect are similar to the above-mentioned pipe strap 70 for a conventional pipe having a ¾" to 2" diameter, as indicated above. Each pipe strap 90, 92 includes an upper or top flange portion 52 having an opening 54 therethrough to receive the conventional threaded bolt 20, and a curved arm 72 which is stepped to provide a reduced lower tab portion 58 having a pair of two opposing slots 60, 62 extending inwardly from the opposite side edges thereof to provide a bottom flange 94 at the lower free end thereof. It is noted, that the curved arm 72 still has a predetermined transverse length 66 and that the predetermined transverse length 68 is still provided between the opposing slots 60, 62. However, the bottom flange 94 is wider than the above-mentioned bottom flange 64, where the bottom flange 94 is provided with the same predetermined transverse length 46 as the above-mentioned bottom flanges 44 of the prior art pipe straps 10, 12.

The bottom flange 94 has a pair of cut-outs 96, 98 in the opposing upper edges on opposite sides thereof, the function of which will be set forth below. Preferably, the lower free edge 100 is curved. Furthermore, to simplify the installation so that only one tool is necessary to tighten the pipe straps, and to also reduce the number of parts required to be assembled, it is preferable to spot-weld the enlarged head 22 of the threaded bolt 20 to the outer surface of the upper flange portion 52 of only one pipe strap 92.

FIGS. 8 and 9 show a modified strut 102, which is substantially the same as the above-mentioned conventional strut 14 except that the spaced apart flanges 36, 38 are provided with longitudinally extending, inwardly turned or directed lips 37, 39 spaced a predetermined distance from the bottom portion 40 of the strut 102, such as shown in the above-mentioned U.S. Pat. No. 3,417,951, No. 4,516,296 and No. 5,141,186. FIG. 8 shows the bottom flange 94 inserted through the slotted hole 42 of the strut 102, where preferably the free ends of the lips 37, 39 engage against the curved lower edge 100 to better position the pipe straps 90, 92. In the assembling thereof, each bottom flange 94 is first inserted at an angle through the length of the slotted hole 42 to pass the entire bottom flange 94 therethrough. Then the pipe straps 90, 92 are rotated 90 degrees, as indicated in FIG. 5, to the position shown in FIG. 8. Thereafter, the selected pipe is secured between the pipe straps 90, 92 in the same manner indicated above.

FIG. 9 shows the bottom flange 94 of either pipe strap 90, 92 inserted through the longitudinally extending opening 32 in the top portion 34 of the strut 102, and then turned 90 degrees so that the lips 37, 39 are inserted in the cut-outs 96, 98 in the bottom flange 94 for a better locking securement thereof. Thereafter, the selected pipe is positioned between the pipe straps 90, 92 and the nut 24 is tightened onto the threaded bolt 20 to secure the pipe to the strut 102 in the same manner mentioned above.

Thus, the straps 90, 92 can be mounted on both the top portion 34 and the bottom portion 40 of either of the struts 14, 102. It is noted, that when the straps 90, 92 are mounted onto the top portion 34 of the strut 14, the cut-outs 96, 98 in the bottom flange 94 will have no function, where the upper edges of the bottom flanges 94 of the pipe straps 90, 92 will engage against the underside of the flanges 36, 38 of the strut 14 in a similar manner as shown in the prior art of FIG. 1.

Numerous alterations of the structures herein disclosed will suggest themselves to those skilled in the art. However, it is to be understood that the present disclosure relates to preferred embodiments of the invention which are for purposes of illustration only, and are not to be construed as a limitation of the invention.

What I claim is:

1. A pipe strap for mounting on a strut to secure a pipe thereto, the strut having a channelled rack arrangement with a longitudinally extending opening in its top portion, and longitudinally spaced apart slotted holes in its bottom portion, said pipe strap comprising:

an elongated body having an upper flange portion with an opening therein to receive a threaded bolt therethrough for clamping the pipe;

said elongated body having a curved arm extending downwardly from said upper flange portion for clamping against the pipe;

tab means for engaging in one of the slotted holes of the strut to secure said elongated body to the strut whereby said pipe strap coacts with another pipe strap to clamp the pipe;

said tab means being a reduced lower tab portion of said curved arm so that said tab portion has a first transverse length between opposite first and second side edges thereof which is shorter than a second transverse length between opposite third and fourth side edges of said curved arm;

said first side edge of said tab portion being stepped inwardly from said third side edge of said curved arm, and said second side edge of said tab portion being stepped inwardly from said fourth side edge of said curved arm;

said tab portion having slot means for receiving opposing walls of the slotted holes of the strut therein for securing said first and second side edges of said tab portion to the strut;

said slot means including a pair of opposing first and second slots disposed in a transverse alignment with each other, said first slot extending inwardly from said first side edge, and said second slot extending inwardly from said second side edge to provide a bottom flange at a lower free end of said tab portion, a third transverse length disposed between said pair of opposing first and second slots being shorter than said first transverse length between said opposite first and second side edges of said tab portion.

2. A pipe strap according to claim 1, wherein said bottom flange has a fourth transverse length between opposite side edges thereof which is longer than said first transverse length between said opposite side edges of said tab portion.

3. A pipe strap according to claim 2, wherein cut-outs are provided in opposing upper edges of said bottom flange on opposite sides thereof to receive inwardly directed lips provided on the upper portion of the strut.

4. A pipe strap according to claim 2, wherein said bottom flange has a curved lower free edge.

5. A pipe strap according to claim 1, wherein the threaded bolt has an enlarged head, said enlarged head being fixedly secured to an outer surface of said upper flange portion to prevent turning thereof.

6. Pipe straps in combination with a strut to secure a pipe thereto;

said strut comprising:

a channelled rack arrangement having a longitudinally extending opening in a top portion thereof;

a bottom portion having longitudinally spaced apart slotted holes;

each of said slotted holes having a predetermined longitudinal length and a predetermined transverse width;

each of said pipe straps comprising;

an elongated body having an upper flange portion with an opening therein to receive a threaded bolt therethrough for clamping the pipe between a pair of said pipe straps;

said elongated body having a curved arm extending downwardly from said upper flange portion for clamping against the pipe;

tab means for engaging in one of said slotted holes of said strut to secure said elongated body to said strut so that said pair of pipe straps coact together to clamp the pipe to said bottom portion of said strut in a fixed engagement therewith;

said tab means being a reduced lower tab portion of said curved arm so that said tab portion has a first transverse length between opposite first and second side edges thereof which is shorter than a second transverse length between opposite third and fourth side edges of said curved arm;

said first side edge of said tab portion being stepped inwardly from said third side edge of said curved arm, and said second side edge of said tab portion being stepped inwardly from said fourth side edge of said curved arm;

said tab portion having slot means for receiving opposing walls of said slotted holes of said strut therein for securing said first and second side edges of said tab portion to said strut;

said slot means including a pair of opposing first and second slots disposed in a transverse alignment with each other, said first slot extending inwardly from said first side edge, and said second slot extending inwardly from said second side edge to provide a bottom flange at a lower free end of said tab portion, a third transverse length disposed between said pair of opposing first and second slots being shorter than said first transverse length between said opposite first and second side edges of said tab portion.

7. Pipe straps according to claim 6, wherein said third transverse length between said two opposing slots is shorter than said predetermined transverse width of each of said slotted holes so that said bottom flange can be locked by said two opposing slots in said one of said slotted holes.

8. Pipe straps according to claim 6, wherein said bottom flange has a fourth transverse length between opposite side edges thereof which is shorter than said predetermined longitudinal length of each of said slotted holes, and which is longer than said predetermined transverse width of each of said slotted holes.

9. Pipe straps according to claim 6, wherein said bottom flange has a fourth transverse length between opposite side edges thereof which is shorter than a transverse width across said longitudinally extending opening in said top portion of said strut.

10. Pipe straps according to claim 6, wherein said bottom flange has a fourth transverse length between said opposite side edges thereof which is longer than a transverse width across said longitudinally extending opening in said top portion of said strut, and which is also longer than said predetermined longitudinal length of each of said slotted holes.

11. Pipe straps according to claim 6, wherein said threaded bolt has an enlarged head, said enlarged head being fixedly secured to an outer surface of said upper flange portion to prevent turning thereof.

12. Pipe straps according to claim 1, wherein said first transverse length between said opposite side edges of said tab portion is shorter than said predetermined longitudinal length of each of said slotted holes, and is longer than said predetermined transverse width of each of said slotted holes.

13. Pipe straps according to claim 6, wherein said bottom flange has a fourth transverse length between opposite side edges thereof which is longer than said first transverse length between said opposite side edges of said tab portion.

14. Pipe straps according to claim 13, wherein cut-outs are provided in opposing upper edges of said bottom flange on opposite sides thereof to receive inwardly directed lips provided on said upper portion of said strut.

15. Pipe straps according to claim 13, wherein said bottom flange has a curved lower free edge.

* * * * *